United States Patent [19]
Butler et al.

[11] 3,773,358
[45] Nov. 20, 1973

[54] TRAILER COUPLING DEVICE

[76] Inventors: Neal L. Butler; Anna S. Butler, both of 4809 Wenton Way, San Jose, Calif. 95124

[22] Filed: Oct. 25, 1972

[21] Appl. No.: 300,473

[52] U.S. Cl. ............................................. 280/513
[51] Int. Cl. ............................................ B60d 1/06
[58] Field of Search ................... 280/511, 513, 512

[56] References Cited
UNITED STATES PATENTS

| | | | |
|---|---|---|---|
| 2,130,100 | 9/1938 | Rasmussen | 280/511 |
| 2,848,253 | 8/1958 | Walker | 280/513 |
| 3,492,024 | 1/1970 | Cooper | 280/512 |
| 2,542,643 | 2/1951 | Duncan | 280/513 |

*Primary Examiner*—Robert R. Song
*Attorney*—I. Robert Mednick

[57] ABSTRACT

The trailer coupling device includes a housing, a block member, and a block moving member. The housing forms an elongated chamber with a semispherical pocket towards the front end of the housing. The lower portion of the housing has a ball opening to receive a ball member, and has a slot extending towards the front end of the housing to enable the ball member to move into the semispherical pocket. The block member is movable up and down in the chamber through a block opening in the upper portion of the housing over the ball opening. The block moving member has an elongated bar pivotally connected to the housing to hold the block member inside the chamber to force the ball member into the semispherical pocket, and has a lifting arm to raise the block member through the block opening to allow the ball member to be removed from the housing through the ball opening.

8 Claims, 9 Drawing Figures

PATENTED NOV 20 1973  3,773,358

TRAILER COUPLING DEVICE

The present invention relates to a trailer coupling device and more particularly relates to a trailer coupling device to releasably connect a trailer to a ball member on top of a stem extending from a cross member attached to a driving vehicle.

A trailer hitch assembly is utilized in connecting a trailer behind a driving vehicle. For connecting a trailer to be towed by an automobile or small truck, the trailer hitch assembly generally includes a ball member held in a ball socket in a coupling device to provide a universal-like joint. This type of ball-in-socket joint connection permits relative angular movement in different directions between the towing vehicle and the trailer. As a result, the trailer can be pulled by the driving vehicle while the trailer sways, moves up and down, or makes other relative movements due to driving and road conditions. The ball member is generally attached on top of a small stem projecting from a cross member fixedly attached to the rear of the driving vehicle. At times, the rear bumper of the driving vehicle may be used as the cross member. The coupling device is fixedly attached to the front end of a forward extension member of a trailer. Such a coupling device is releasably connected to the ball member, so that the trailer can be removed to allow the vehicle to be used by itself.

Many existing coupling devices utilize bolts, screws, and other adjusting and attaching means to secure the coupling device to the ball member. After a time, these bolts, screws, and other adjusting and attaching means will become loose and separate due to vibrations, impacts, and other travel movements when in use. Consequently, the trailer may become disconnected from the driving vehicle. For this reason, it is common to also provide chains or the like as additional connecting means between the trailer and the driving vehicle. These additional connecting means provide an emergency temporary connection in the event that the coupling device is inadvertently disconnected from the ball member.

Further, it is not desirable to have the trailer moved at too large an angle with respect to the vehicle. In the situation when the towing vehicle makes sharp turns at low rates of speed, either in the forward direction or when backing up, such large angular relative positioning may be caused.

In accordance with this invention, a trailer coupling device is provided to connect a trailer to a ball member on top of a stem extending from a cross member attached to a driving vehicle. The trailer coupling device includes a housing, a block member, and a block moving member. The housing forms an elongated chamber with a semispherical pocket towards the front end of the housing. A ball opening and a slot is provided in the lower portion of the housing to admit the ball member in the chamber and to allow it to move into the semispherical pocket. The block member is movable up and down in the chamber through a block opening in the upper portion of the housing over the ball opening. The block moving member can hold the block member inside the chamber to force the ball member into the semispherical pocket, and can raise the block member to allow the ball member to be removed.

It is therefore an object of this invention to provide a trailer coupling device to releasably connect a trailer to a ball member on top of a stem extending from the rear of a driving vehicle.

Another object of this invention is to provide a trailer coupling device which can be readily and easily connected and disconnected by a user.

Still another object of this invention is to provide a trailer coupling device that positively prevents separation or disconnection from a ball member extending from the rear of a driving vehicle when the trailer is being towed.

A further object of this invention is to provide a trailer coupling device that requires no adjustments after being coupled to the ball member for acheiving a ball-in-socket engagement.

A still further object of this invention is to provide a trailer coupling device that includes switch means to enable a signal to be developed to detect when the trailer is turned at a greater than desired angle with respect to the driving vehicle.

Still another object of this invention is to provide a trailer coupling device that is simple in design, economical to manufacture, and readily usable.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the present invention.

Figure 1:
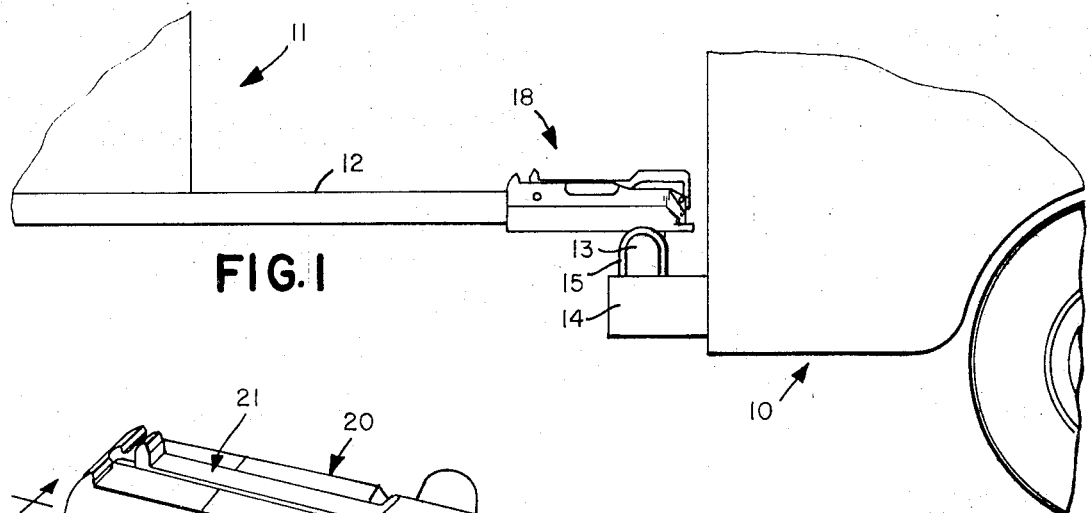
FIG. 1 is a side view showing a trailer connected to a driving vehicle by a trailer coupling device of this invention.
Figure 2:
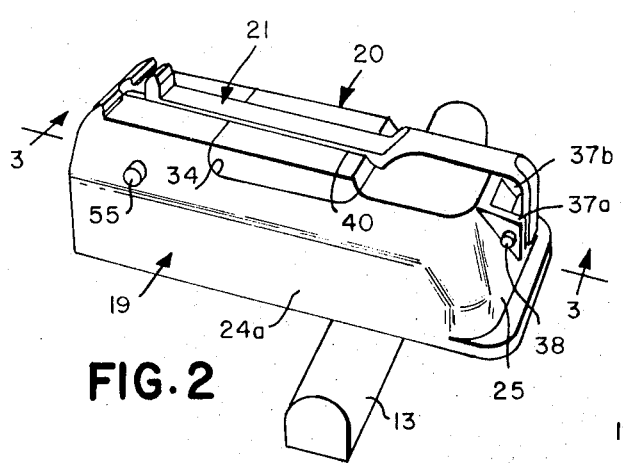
FIG. 2 is an enlarged perspective view of the trailer coupling device seen in FIG. 1.
Figure 3:
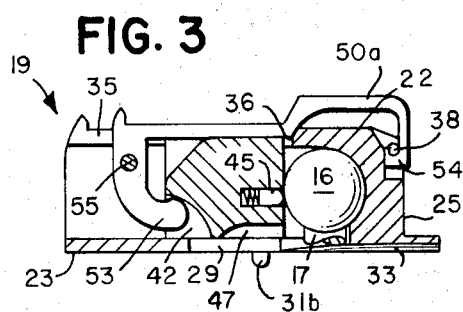
FIG. 3 is a cross-sectional view of the trailer coupling device as seen along lines 3—3 of FIG. 2.

In the drawings, FIG. 1 shows an automobile 10 as the driving vehicle, and a trailer 11 with a forward extension member 12. A cross member 13 is seen connected on top of rear bumper 14 of vehicle 10 by U-bolts 15 or the like to provide a sturdy connection thereto. As seen in FIGS. 2 and 3, a ball member 16 on top of a stem 17 extends vertically from cross member 13. Such and similar arrangements of ball members attached to towing vehicles are generally and commonly utilized for hitch connections to trailers. The forward extension member 12 of trailer 11 has a trailer coupling device 18 of this invention fixedly secured thereto at its end. In FIG. 1, ball member 16 is enclosed in trailer coupling device 18 so that trailer 11 can be towed by vehicle 10.

Referring now to FIGS. 2 through 5, trailer coupling device 18 includes a housing 19, a block member 20, and a block moving member 21. Housing 19 has a top section or upper portion 22, a bottom section or lower portion 23, two opposite sides 24a and 24b, and a front end 25 forming an elongated chamber 26. Front end 25 has an inner semispherical surface 27 forming a semispherical pocket 28 towards the front end of housing 19.

Figure 4:
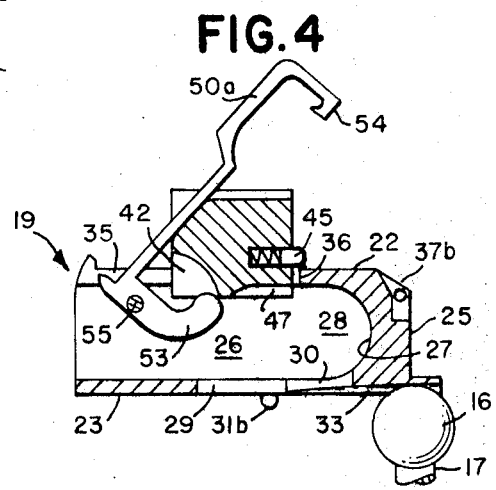
FIG. 4 is a view similar to FIG. 3 except that the block member therein is seen raised and the ball member is shown under the housing prior to entering its chamber through the ball opening.
Figure 5:
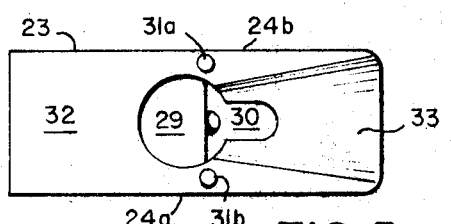
FIG. 5 is a bottom view of only the housing of the illustrated trailer coupling device of this invention.

As seen more clearly in FIG. 5, lower portion 23 of housing 19 has a circular ball opening 29 located about the center thereof. Circular ball opening 29 is slightly larger in diameter than ball member 16 to allow ball member 16 to enter chamber 26 therethrough. A slot 30 extends from ball opening 29 towards the front end of housing 19 for receiving stem 17 connected to ball member 16. Slot 30 allows stem 17 to move therealong so that ball member 16 when in chamber 26 can be moved into semispherical pocket 28. A pair of switches 31a and 32b extend from the bottom 32 of lower section 23 and are located on both sides of ball opening 29. Switches 31a and 31b may be of the push button type, i.e. each has a spring retained plunger to close electrical contacts when depressed by a member moving along bottom 32. Lower portion 23 also has an inwardly curved surface 33 extending from the sides 24a and 24b towards ball opening 29. Inwardly curved surface 33 converges downwardly from the bottom of front end 25 towards ball opening 29 to enable ball member 16 as seen in FIG. 4 to be guided into ball opening 29.

Upper portion 22 of housing 19 has a block opening 34 to accomodate block member 20 in allowing it to move up and down in block opening 34. Block opening 34 is located over ball opening 29. Upper portion 22 also has a slot 35 extending from the back edge of block opening 34 towards the rear of housing 19 in order to allow block moving member 21 to be fitted therein. A small curved cutout 36 in upper portion 22 is located at the center of the front edge of block opening 34. A pair of projections 37a and 37b extend from front end 25 and have holes therein to hold a locking pin 38, a bolt, or the like.

Figure 6:
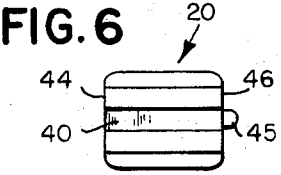
FIG. 6 is a top view of only the block member of the illustrated trailer coupling device of this invention.
Figure 7:
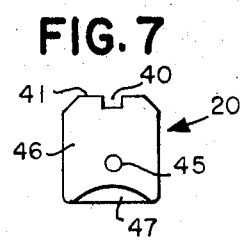
FIG. 7 is a front elevational view of the block member seen in FIG. 6.
Figure 8:
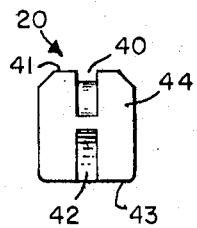
FIG. 8 is a rear elevational view of the block member seen in FIG. 6.
Figure 9:
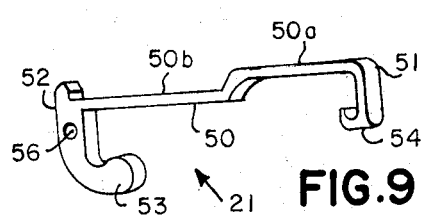
FIG. 9 is a perspective view of the block moving member of the illustrated trailer coupling device of this invention.

As seen more clearly in FIGS. 6, 7, and 8, block member 20 is a six sided member having a guide recess 40 along the center of top 41, a lifting recess 42 along its bottom 43 extending partially up its rear side 44, and a spring retained pin 45 projecting from the center of its front side 46. A cutout 47 with a semispherical surface is also provided on the forward bottom edge of block member 20. Cutout 47 provides clearance to allow block member 20 to be partially in chamber 26 when ball member 16 is in chamber 26. As seen more clearly in FIG. 9, block moving member 21 includes an elongated bar 50 having a forward end 51 and a rear end 52, and a lifting arm 53 extending downwardly from rear end 52 toward the front end 51. Rear end 52 of block moving member 21 has an inwardly curved extension 54. Elongated bar 50 has a front portion 50a which is raised above its rear portion 50b to form a gripping handle.

In assembling the trailer coupling device of this invention, as seen in FIGS. 2, 3, and 4, block member 20 is initially inserted in chamber 26 of housing 19 through block opening 34. Then, the rear end 52 of elongated bar 21 is pivotally connected to housing 19 by a pin 55 extending through holes in sides 24a and 24b of housing 19, and through hole 56 in block moving member 21. Connected in this manner, rear portion 50b of elongated bar 50 will fit within guide recess 40 of block member 20, lifting arm 53 of elongated bar 50 will fit within lifting recess 42 of block member 20, and inwardly curved extension 54 of elongated bar 50 will extend down between projections 37a and 37b of housing 19.

In order to connect trailer coupling device 18 to ball member 16, forward end 51 of elongated bar 50 is initially moved upwardly by gripping and pulling front portion 50a. Elongated bar 50 will pivot at its rear end 52 about pin 55 causing lifting arm 53 in lifting recess 42 to lift block member 20 up through block opening 34. Curved cutout 36 enables spring retained pin 45 to easily move therealong exerting little pressure. Spring retained pin 45 will then project above the top of housing 19 to maintain this position as seen in FIG. 4. Now, vehicle 10 with its ball member 16 on top of stem 17 extending from cross member 13 attached thereto is moved towards trailer 11 with coupling device 18 fixedly attached to the end of its forward extension member 12. Ball member 16 will be under curved surface 33 as seen in FIG. 4 to be easily guided into ball opening 29.

With ball member 16 inside chamber 26 of housing 19, vehicle 10 may be moved slightly forward (or trailer 11 may be moved slightly backwards) to cause ball member 16 to be inside semispherical pocket 28. Then, forward portion 50a is pushed down to lower forward end 51 and to cause rear portion 50b in guide recess 40 to press against block member 20 to lower it in chamber 26 of housing 19. As seen in FIG. 3, spring retained pin 45 will now press against ball member 16 to hold it in semispherical pocket 28 of housing 19. Locking pin 38 can now be inserted through the holes in projections 37a and 37b to lock elongated bar 50 in this closed position. Trailer 11 is now connected to be towed by vehicle 10.

In the case when trailer 11 is moved at a large angle with respect to vehicle 10, it will be realized that either switch 31a or switch 31b on the bottom of housing 19 will be actuated by cross member 13, depending upon the direction of turning. Switches 31a and 31b are located on the bottom of housing 19 so that one or the other will be actuated when trailer 11 is at a selected or predetermined angle with respect to vehicle 10. Switches 31a and 31b can be connected to any convenient or conventional electrical circuit to turn on a lamp or operate a device to give a warning. In that event, the driver of the vehicle will be able to take measures to prevent the situation caused by the excessive turning.

In order to disconnect trailer 11 from vehicle 10, locking 38 is removed and elongated bar 50 is moved upwards as previously described in preparing trailer coupling device 18 for being connected to vehicle 10. Then, ball member 19 can be moved out of chamber 26 of housing 19 to disconnect trailer 11 from vehicle 10.

Having herein described the invention, what is claimed as new is:

1. A trailer coupling device to releasably connect a trailer to a ball member on top of a stem extending from a cross member attached to a driving vehicle, said trailer coupling device comprising:

a housing forming a chamber with a semispherical pocket towards the front end of the housing, said housing including a lower portion with a ball opening and a slot extending towards the front end of the housing for admitting the ball member inside the chamber through the ball opening, and for receiving the stem of the ball member in the slot as the ball member is moved in the chamber away from the ball opening towards the semispherical pocket, and said housing including an upper portion with a block opening;

a block member movable up and down in the chamber through the block opening and over the ball opening; and a block moving member including an elongated bar having a forward end and a rear end and including a lifting arm fitted inside the chamber and extending downwardly from the rear end of the bar towards the front end of the bar, said rear end of the bar being pivotally connected to the housing, said forward end of the bar being movable upwardly to pivot the rear end of the bar to cause the lifting arm to raise the block member through the block opening, and said forward end of the bar being movable downwardly to cause the bar to press against the block member inside the chamber in order to hold the ball member in the semispherical pocket.

2. The trailer coupling device in accordance with claim 1 wherein the bottom of said lower portion of the housing has an inwardly curved surface converging downwardly from the front end of the housing towards the ball opening for guiding the ball member into the ball opening.

3. The trailer coupling device in accordance with claim 2 in which said block member has a guide recess along its top surface to receive and guide the elongated bar as it is being moved, and said block member has a lifting recess along its bottom surface for receiving the free end of the lifting arm in order to lift the block member.

4. The trailer coupling device in accordance with claim 3 which additionally includes electrical switches on the bottom of the lower portion of the housing on both sides of the ball opening, said switches to be actuated by the cross member attached to the driving vehicle when the trailer is at a predetermined angle with respect to the driving vehicle, and which also includes means for securing the forward end of the elongated bar to the housing in order to prevent the block member from being raised in the chamber.

5. A trailer coupling device to releasably connect a trailer to a ball member on top of a stem extending from a cross member attached to a driving vehicle, said trailer coupling device comprising:

a housing forming an elongated chamber with a semispherical pocket towards the front end of the housing, said housing including a lower portion with a ball opening and a slot extending towards the front end of the housing for admitting the ball member inside the chamber through the ball opening, and for receiving the stem of the ball member in the slot as the ball member is moved in the chamber away from the ball opening towards the semispherical pocket, and said housing including an upper portion with a block opening over the ball opening and with a slot extending towards the rear end of the housing;

a block member movable up and down in the chamber through the block opening and over the ball opening, said block member including spring retained means to urge the ball member towards the semispherical pocket; and a block moving member including an elongated bar having a forward end and a rear end and including a lifting arm fitted inside the chamber through the slot in said upper portion of the housing and extending downwardly from the rear end of the bar towards the front end of the bar, said rear end of the bar being pivotally connected to the housing, said forward end of the bar being movable upwardly to pivot the rear end of the bar to cause the lifting arm to raise the block member through the block opening, and said forward end of the bar being movable downwardly to cause the bar to press against the block member inside the chamber in order to hold the ball member in the semispherical pocket.

6. The trailer coupling device in accordance with claim 5 wherein the bottom of said lower portion of the housing has an inwardly curved surface converging downwardly from the front end of the housing towards the ball opening for guiding the ball member into the ball opening.

7. The trailer coupling device in accordance with claim 6 in which said block member has a guide recess along its top surface to receive and guide the elongated bar as it is being moved, and said block member has a lifting recess along its bottom surface for receiving the free end of the lifting arm in order to lift the block member.

8. The trailer coupling device in accordance with claim 6 which additionally includes electrical switches on the bottom of the lower portion of the housing on both sides of the ball opening, said switching to be actuated by the cross member attached to the driving vehicle when the trailer is at a predetermined angle with respect to the driving vehicle, and which also includes means for securing the forward end of the elongated bar to the housing in order to prevent the block member from being raised in the chamber.

* * * * *